United States Patent [19]

Goodall et al.

[11] 4,419,501

[45] Dec. 6, 1983

[54] OLEFIN POLYMERIZATION CATALYST COMPONENTS AND POLYMERIZATION PROCESS

[75] Inventors: Brian L. Goodall; Jacob C. Van Der Sar, both of Amsterdam, Netherlands

[73] Assignee: Shell Oil Company, Houston, Tex.

[21] Appl. No.: 345,900

[22] Filed: Feb. 4, 1982

Related U.S. Application Data

[62] Division of Ser. No. 207,848, Nov. 18, 1980, Pat. No. 4,343,721.

[30] Foreign Application Priority Data

Nov. 20, 1979 [GB] United Kingdom ............... 7940131

[51] Int. Cl.$^3$ .......................... C08F 4/02; C08F 10/00
[52] U.S. Cl. .................................. 526/122; 526/125; 526/351; 526/906
[58] Field of Search ............................... 526/122, 125

[56] References Cited

U.S. PATENT DOCUMENTS

| | | | |
|---|---|---|---|
| 4,069,169 | 1/1978 | Toyoda et al. | 526/906 |
| 4,246,136 | 1/1981 | Ueno et al. | 526/125 |
| 4,321,345 | 3/1982 | Sato et al. | 526/125 |

FOREIGN PATENT DOCUMENTS

| | | |
|---|---|---|
| 2738627 | 3/1978 | Fed. Rep. of Germany . |
| 1564460 | 4/1980 | United Kingdom . |

*Primary Examiner*—Edward J. Smith

[57] ABSTRACT

A process for the preparation of an olefin polymerization catalyst component which comprises contacting a solid composition obtained by combining a magnesium halide, an electron donor and a tetravalent titanium compound, this composition being substantially free from aluminum compounds, with a liquid medium comprising a halide of B, Al, Ga, In, Tl, Sn or Sb, these elements being present in their highest valency state or a halide of tetravalent Te, and removing from the catalyst component substantially all metal halide originating from the liquid medium as by washing the catalyst component with a hydrocarbon or halohydrocarbon liquid.

19 Claims, No Drawings

OLEFIN POLYMERIZATION CATALYST COMPONENTS AND POLYMERIZATION PROCESS

This is a division of application Ser. No. 207,848, filed Nov. 18, 1980, now U.S. Pat. No. 4,343,721.

The present invention relates to the preparation of olefin polymerization catalyst components comprising a magnesium halide and a tetravalent titanium compound. The invention also relates to a process for the polymerization of olefins using such catalyst components.

Numerous proposals are known from the prior art to provide olefin polymerization catalysts obtained by combining a component comprising a magnesium halide and a titanium compound with a second component comprising an organoaluminum compound. The polymerization activity and the stereospecific performance of such compositins may be improved by incorporating an electron donor (Lewis base) into the component comprising titanium, into the organoaluminum component or preferably, into both of these. The catalyst compositions of this type which have been disclosed in the prior art are able to produce olefin polymers in an attractive high yield, calculated as g polymer/g titanium, and also with the required high level of stereoregular polymeric material. However, this advantage is normally achieved at the detriment of polymer yields, calculated as g polymer/g aluminum or g polymer/g total catalyst. The attractive high polymerization activities of the relevant catalyst compositions known from the prior art are only obtained when employing very large amounts of activating organoaluminum compounds, e.g. amount, defined in the atomic ratio of aluminum to titanium, of at least 50:1, in many cases even 100:1 or more. In addition to this, many of the proposed catalyst compositions have the disadvantage that an adequate control of the molecular weight by polymerizing in the presence of hydrogen cannot be achieved without impairing the stereospecific performance of the catalysts. This also applies to catalysts in which the organoaluminum component does not contain any electron donor.

The present invention relates to a process for producing an olefin polymerization catalyst component which comprises contacting a solid composition obtained by combining a substantially anhydrous magnesium halide, an electron donor and a tetravalent titanium compound, this composition being substantially free from aluminum compounds, with a liquid medium comprising a halide of B, Al, Ga, In, Tl, Sn or Sb, these elements being present in their highest valency state, or a halide of tetravalent Te, and removing from the catalyst component substantially all metal halide originating from the liquid medium by washing the catalyst component with a hydrocarbon or halohydrocarbon diluent.

When the catalyst components produced in accordance with this novel process are combined with activating organoaluminum compounds, the resulting catalysts have a very high olefin polymerization activity and a very attractive stereospecific performance. In order to obtain the latter there is no need to modify the organoaluminum compounds by reacting with an electron donor; the organoaluminum compounds can be used per se, which is an important advantage over the vast majority of the Mg/Ti halide catalyst systems proposed in the prior art. In addition, the stereospecific performance of the catalysts is little affected, if any, by the presence of hydrogen during olefin polymerization, even at increased pressures of, for example, 5000 kPa.

When in this description reference is made to a solid composition obtained by combining a magnesium halide, a tetravalent titanium compound and an electron donor, the words "obtained by combining" should be interpreted as relating to any possible way of preparing a solid composition which contains these different components as essential and indispensable constituents. Hence, the possible ways of combining these constituents are not restricted to mutually contacting the previously prepared constituents, but include as well methods in which one or more of the essential components are formed in situ when reacting starting materials which as such are different from the envisaged essential constituents. Thus, a composition comprising a magnesium halide and a tetravalent titanium compound may be obtained by reacting, e.g., a magnesium carboxylate, -oxide, -carbonate, -dialkoxide or -diaryloxide, with a titanium tetrahalide or with an alkoxy- or aryloxy titanium trihalide. When employed, such reactions will normally be carried out so as to effect a conversion as complete as possible of the magnesium compound into magnesium dihalide. Other forms of in situ formation of magnesium dihalides are the conversion of magnesium alkoxy halides or -aryloxy halides with, e.g., a titanium tetrahalide. Here again, it is preferred that the conversion into magnesium dihalide is substantially complete.

The various ways of forming the magnesium halide in situ do not include the use of magnesium compounds which would reduce a tetravalent titanium compound to a lower valency. Hence, reactions of typical organomagnesium compound, e.g., dialkyl magnesium and diaryl magnesium, alkyl magnesium halides and aryl magnesium halides, with a titanium tetrahalide are excluded.

Preferred magnesium halides contained in the solid composition are magnesium dihalides, particularly magnesium dichloride. These compounds are substantially anhydrous, i.e., they comprise less than 5% mol. of water, preferably less than 1% mol.

Another group of compounds that should be substantially absent from the solid composition are aluminum compounds. Although small amounts thereof may be contained in solid compositions, no advantage is gained thereby and the amounts are therefore restricted to at most 5% mol., based on the molar amount of magnesium halide. The most preferred solid compositions contain less than 0.05% mol. of aluminum.

In addition to the aforesaid ways concerning in situ preparations of magnesium halides, the solid compositions can be prepared by any suitable way of mixing or blending the different groups of essential constituents, in any order.

Thus, the titanium compound may be incorporated into a composition already comprising a magnesium halide and electron donor, or the electron donor may be incorporated into a composition comprising a magnesium halide and a titanium compound. Likewise, the electron donor and the titanium compound may be added to the magnesium halide in one single operation.

Suitable tetravalent titanium compounds are titanium tetrahalides, alkoxy titanium trihalides, dialkoxy titanium dihalides and trialkoxy titanium halides. Titanium tetrahalides are preferred, particularly $TiCl_4$.

Suitable electron donor are ethers, esters, ketones, phenols, amines, amides, imines, nitriles, phosphines, phosphites, stibines, arsines, phosphoramides, alcohols and alcoholates.

Preferred electron donors are those not comprising an active hydrogen atom. Particular preference is given to esters, most suitably esters of aromatic carboxylic acids, and tertiary amines. Examples thereof are ethyl and methyl benzoate, p-methoxy ethyl benzoate, p-ethoxy methyl benzoate, ethyl acrylate, methyl methacrylate, ethyl acetate, dimethyl carbonate, dimethyl adipate, dihexyl fumarate, dibutyl maleate, ethylisopropyl oxalate, ethyl-p-chlorobenzoate, hexyl-p-aminobenzoate, isopropyl naphthenate, n-amyl toluate, ethyl cyclohexanoate, propyl pivalate, N,N,N'N'-tetramethyl ethylene diamine, 1,2,4-trimethyl piperazine, 1,3,4,5-tetraethyl piperidine and similar compounds, as well as mixtures thereof. The amounts of the essential constituents of the solid composition will usually be selected from the following ranges (calculated per mol. of magnesium halide): Electron donor: 0.01 to 5.0 mol., preferably 0.5 to 2.0 mol.; Ti-compound: 0.005 to 5 mol., preferably 0.01 to 1.5 mol.

Before the solid composition is contacted with the liquid medium comprising a metal halide as defined hereinbefore, the solid material may be washed in order to remove any excess of unreacted, physically absorbed material or to remove any electron donor which is not strongly bound in the composition. Suitable washing liquids are organic diluents, such as hydrocarbons, e.g., isopentane, hexanes, heptanes, iso-octane, decane, benzene, toluene or xylene, and halohydrocarbons, such as chlorobenzene, chlorotoluene, chlorobutane, chlorohexane, 1,2-dichloroethane, trichloromethane, 1,1,2-trichloroethane and carbon tetrachloride.

The contacting of the solid composition with the liquid medium comprising the halide of the specified elements is suitably carried out by suspending the solid composition in the liquid medium and continuing stirring for some time, which may range from a rather short period of, e.g., 10 minutes, to several hours, preferably up to 4 hours. The contacting temperature is not critical and may vary from 0° C. to the boiling point of the liquid mixture. Preferred temperatures are from 15° to 80° C. In addition to the defined halides the liquid medium will normally comprise a liquid organic diluent, for example a hydrocarbon diluent such as isopentane, a hexane, a heptane, iso-octane, toluene, benzene or xylene. More preferred are halohydrocarbon diluents, for example any of the halohydrocarbons referred to hereinbefore. The liquid medium can be employed in the form of a suspension of the relevant halide in the diluent, but the use of solutions is preferred.

The liquid medium will generally comprise from 1 to 50% mol. of the halides of the defined elements, calculated on the amount in gram-atoms of tetravalent titanium contained in the solid composition. Preferred amounts are from 2 to 10% mol.

The relevant halides contained in the liquid medium can be any fluoride, chloride, bromide or iodide of trivalent B, Al, Ga, In, Tl, tetravalent Sn or Te or pentavalent Sb. Preferred halides are $GaCl_3$, $GaBr_3$, $InCl_3$, $TiCl_3$, $SnCl_4$, $AlBr_3$, $AlI_3$, $AlCl_3$, $BCl_3$, $BBr_3$, $BI_3$, $SbCl_5$, $TeCl_4$ and $SbF_5$. Of this group of halides the following compounds are especially preferred: $SnCl_4$, $SbCl_5$, $SbF_5$, $AlBr_3$, $BBr_3$, $AlI_3$, $BCl_3$, $TeCl_4$, $InCl_3$ and $GaCl_3$. The most preferred compounds are $SnCl_4$, $SbCl_5$ and $SbF_5$.

When treating the solid composition with the liquid medium containing a metal halide, it is essential that this contacting result in as little incorporation of the relevant metal halide into the catalyst component as possible. To this end, the liquid media are preferably employed in a very dilute form, i.e., as suspensions or solutions in in which the concentration of metal halide is less than 0.18 mol. per 100 mol. of liquid diluent. Most preferred are molar concentrations of less than 0.07 mol. per 100 mol. diluent.

Subsequent to the contacting treatment the catalyst components are thoroughly washed with one or more hydrocarbon or halohydrocarbon diluents, preferably at a temperature above 40° C. Suitable examples of diluents are those set out above. This washing serves to reduce the content of metal halide originating from the liquid medium as much as possible. Nevertheless, because the magnesium halides contained in the catalyst components are very hygroscopic materials, it may not be possible to completely exclude the presence of minute amounts of water in the catalyst component. This water may react with the metal halides employed so that the presence of metal halide in the catalyst component can not be ruled out altogether. For this reason the presence in the catalyst components of minute amounts of metal halide originating from the liquid medium is tolerated, provided that these amounts shall not exceed 0.1 mmol. of metal halide per g of catalyst component. The preferred tolerance is less than 0.02 mmol. per g of catalyst component.

The treatment with the defined liquid medium may be followed by incorporating a fresh amount of a tetravalent titanium compound into the catalyst component, preferably an amount of from 0.02 to 1.0 mol. of titanium compound per mol. of magnesium halide. This can be done, for example, by slurrying the solid composition in a solution of $TiCl_4$ in toluene or by suspending the solid in liquid $TiCl_4$ at an elevated temperature, e.g., 80° C. The composition is then washed with an inert organic diluent in order to remove any excess of $TiCl_4$.

To prepare the final polymerization catalyst the solid component is combined with an organoaluminum compound, preferably employing such amounts as to produce in the final catalyst composition an atomic ratio of aluminum to titanium of 1:1 to 20:1. Higher Al:Ti ratios, e.g. 35:1 to 70:1 may be employed when the aluminum compound is complexed with an electron donor, as discussed below and illustrated in runs s, t and u of the Examples. Suitable organoaluminum compounds are trialkyl aluminum compounds, dialkyl aluminum halides and dialkyl aluminum alkoxides. Trialkyl aluminum compounds are preferred, particularly those wherein each of the alkyl groups has 2 to 6 carbon atoms, e.g., triethyl aluminum, tri-n-propyl aluminum, tri-isobutyl aluminum, tri-isopropyl aluminum and dibutyl-n-amyl aluminum.

If desired, the organoaluminum compounds may be complexed with any of the electron donors discussed herein, but it is noted that there is no strict need for doing so. The catalysts of the present invention have an excellent polymerization activity and a very attractive stereospecific performance already when employing non-complexed organoaluminum compounds. Thus, in many cases no particular advantage will be obtained by the relevant application of complexed activating compounds. The use of non-complexed activating compounds is therefore generally preferred.

The present invention is also concerned with a process for polymerizing an olefin such as ethylene or n-butene, preferably propylene, employing the novel polymerization catalysts. These polymerizations may be carried out by any one of the conventional techniques, such as gas-phase polymerization or slurry polymerization using liquid monomer or an inert hydrocarbon diluent as liquid medium. Hydrogen may be used to control the molecular weight of the polymer without detriment to the stereospecific performance of the catalysts. Polymerization may be effected batchwise or continuously, with constant or intermittent supply of the novel polymerization catalysts or one of the catalyst components to the polymerization reactor. The activity and stereo regulating ability of the novel polymerization catalysts is so pronounced that there is no need for any catalyst removal or polymer extraction techniques. Total inorganic residues in the polymer, i.e., the combined aluminum, chlorine, magnesium and titanium content, can be as low as 200 ppm, even less than 50 ppm, as will be shown in the Examples. In all Examples the molar amounts of metal halide employed are indicated as % mol., i.e., referring to the amount in millimoles of metal halide to be added per 100 milliatoms of Ti contained in the solid products to be reacted with the relevant liquid medium. Where the Examples refer to the content of $SbCl_5$ in the catalyst components, this content was determined by neutron activation analysis.

In all the treating and washing steps of this invention, as well as in olefin polymerization processes utilizing the catalysts of this invention, the diluents and liquids should be anhydrous or at least substantially anhydrous, i.e., as low in water content as can be achieved by efficient drying. Water contents not exceeding 20 ppm will generally be satisfactory.

The following examples illustrate the invention and its preferred embodiments, but are not to be considered as limiting the invention.

EXAMPLE I 20 g of $MgCl_2$, comprising less than 1.0% wt of water and less than 0.5% wt of aluminum, was ground at 40° C. on position 7 in a 250 ml Fritsch Pulverisette ball mill with 6 steel balls of 20 mm and 20 steel balls of 10 mm diameter under nitrogen for 16 hours in the presence of 4.8 g ethyl benzoate (0.15 mol. per mol. of $MgCl_2$). Then, an additional 4.8 g of ethyl benzoate was added and the milling was continued for another 16 hours. Finally 10.6 g $TiCl_4$ (0.27 mol. per mol. of $MgCl_2$) was added and the product was milled for an additional 24 hours.

Upon analyzing the yellow reaction product (Solid A) it was found to contain 6.7% wt of Ti and 24% wt of ethyl benzoate.

This product was washed 9 times with 120 ml iso-octane at 75° C., thus producing a solid (catalyst component A) comprising 4.5% wt of Ti.

EXAMPLE II 2.00 g of Solid A was slurried in 45 ml (561 mmol.) 1,2-dichloroethane comprising 5% mol. $SnCl_4$ and the mixture was stirred at 75° C. during 2 hours. Then, the liquid phase was decanted and the solid was washed one time with 50 ml 1,2-dichloroethane and 5 times with 50 ml iso-octane at 75° C. A solid (cat. component 1) was obtained which contained 1.3% wt of Ti.

EXAMPLE III 2.05 g of solid A was slurried in 50 ml 1,2-dichloroethane comprising 5% mol. $SbCl_5$ and the mixture was stirred at 75° C. during 2 hours. Then the liquid phase was decanted and the solid was washed one time with 50 ml 1,2-dichloroethane and 5 times with 50 ml iso-octane at 75° C. The solid so obtained (cat. component 2) contained 1.3% wt of Ti and 0.005 mmol. $SbCl_5$/g cat.

EXAMPLE IV 1.99 g of solid A was slurried in 50 ml. 1,2-dichloroethane comprising 5% mol. $SbCl_5$ and the mixture was stirred at 50° C. during 2 hours. Then the liquid phase was decanted and the solid was washed one time with 1,2-dichloroethane (50 ml) and five times with 50 ml iso-octane. The solid so obtained (cat. component 3) contained 1.0% wt of Ti.

EXAMPLE V 2.08 g of solid A was washed 9 times with 50 ml iso-octane at 75° C. and then slurried in 50 ml 1,2-dichloroethane comprising 5% mol. of $SbCl_5$. The mixture was stirred at 50° C. during 2 hours and after decanting, the solid was washed 1 time with 50 ml 1,2-dichloroethane and 5 times with 50 ml iso-octane at 50° C. The solid so obtained (cat. component 4) contained 1.1% wt of Ti.

EXAMPLE VI 2.00 g of catalyst component 4, described in Example V, was suspended in 50 ml (560 mmol.) undiluted $TiCl_4$ at 80° C. and the mixture was stirred at that temperature for 2 hours. Then the liquid phase was decanted and the solid was washed 7 times with 50 ml iso-octane at 80° C. The solid so obtained (cat. component 5) contained 1.8% wt of Ti.

EXAMPLE VII 2.02 g of solid A was suspended in 50 ml n-butyl chloride containing 5% mol. of $SbCl_5$ at 50° C. and the mixture was stirred at that temperature during 2 hours. After removal of the liquid phase, the solid was washed 1 time with 50 ml n-butyl chloride and 5 times with iso-octane at 50° C. The solid so obtained (cat. component 6) was found to contain 1.8% wt of Ti.

EXAMPLE VIII 2.0 g of solid A was slurried in 50 ml 1,2-dichloroethane comprising 3% mol. of $SbF_5$ and the mixture was stirred at 50° C. during 2 hours. After decanting the liquid phase, the solid was washed 1 time with 50 ml 1,2-dichloroethane and 5 times with 50 ml iso-octane at 50° C. The solid so obtained (cat. component 7) comprised 1.3% wt of Ti.

EXAMPLE IX (FOR COMPARISON)

1.04 g of solid A was washed 1 time with 100 ml 1,2-dichloroethane and 6 times with 100 ml iso-octane at 75° C. during 2 hours. The resulting solid (cat. component B) contained 1.4% wt of Ti.

EXAMPLE X 2.00 g of solid A was slurried in 50 ml toluene comprising 5% mol. $SbCl_5$ and the mixture was stirred at 50° C. during 2 hours.

Then, the liquid phase was decanted and the solid was washed 1 time with 50 ml toluene at 75° C. and then 5 times with 50 ml iso-octane at 75° C. The resulting solid (cat. component 8) comprised 1.5% w Ti.

EXAMPLE XI 3.02 g of solid A was slurried in 75 ml 1,2-dichloroethane comprising 10% mol $SbCl_5$ and the mixture was stirred at 75° C. for 2 hours.

Then, the liquid phase was decanted and the solid was washed 1 time with 75 ml 1,2-dichloroethane and 5 times with 75 ml iso-octane at 75° C. The resulting solid (cat. component 9) comprised 1.2% w Ti and 0.038 mmol. $SbCl_5$/g cat.

EXAMPLE XII 2.0 g of solid A was slurried in 50 ml 1,2-dichloroethane comprising 50% mol. $SbCl_5$ and the mixture was stirred at 75° C. during 2 hours.

Then, the liquid phase was decanted and the solid was washed 2 times with 50 ml 1,2-dichloroethane and 5 times with 50 ml iso-octane at 75° C. The resulting solid (cat. component 10) comprised 1.4% w Ti and 0.042 mmol. $SbCl_5$/g cat.

EXAMPLE XIII 20 g of $MgCl_2$, comprising less than 1.0% w of water and less than 0.5% w of aluminum was brought into a 250 ml stainless steel vessel containing 6 stainless steel balls of 20 mm diameter and 20 stainless steel balls of 10 mm diameter under nitrogen. 5.04 g of ethyl benzoate was added and the mixture was ball-milled in a Fritsch Pulverisette apparatus on position 7 for 24 hours at an internal temperature of 45°–50° C.

Then, 4.90 g of ethyl benzoate was added and the mixture was similarly ball-milled for a further 20 hours. Finally, 11.2 g of $TiCl_4$ was introduced into the vessel and the ball-milling was continued for a further 20 hours.

Upon analyzing the yellow reaction product (Solid B) it was found to contain 6.8% w Ti and 24.3% w ethyl benzoate. 30.3 g of solid B was slurried in 500 ml 1,2-dichloroethane at 50° C. To this slurry was added 1.28 mmol. neat $SbCl_5$ (3% mol. on Ti) and stirring was continued at 50° C. for 2 hours.

Then, the liquid phase was decanted and the solid was washed 1 time with 500 ml 1,2-dichloroethane and 5 times with 500 ml iso-octane at 75° C.

The solid so obtained (cat. component 11) contained 0.9% Ti.

EXAMPLE XIV 30.1 g of $MgCl_2$, comprising less than 1.0% water and less than 0.5% w aluminum, was brought into a 250 ml stainless steel vessel containing 6 balls of 20 mm diameter and 20 balls of 10 mm diameter under nitrogen. 7.47 g of ethyl benzoate was added and ball-milling was carried out for 20 hours as described in Example XIII.

Then, 7.62 g of ethyl benzoate was added and the mixture was similarly ball-milled for a further 20 hours. Then 10.2 g of the resulting mixture was removed, leaving 35.0 g mixture in the vessel. To this remainder 12.22 g of $TiCl_4$ was added and ball-milling was continued for 20 hours. Upon analyzing the yellow reaction product (Solid C) it was found to contain 6.5% w Ti and 24.5% ethyl benzoate. 32.1 g of solid C was slurried in 500 ml. 1,2-dichloroethane comprising 3.7% mol. $SbCl_5$ and the mixture was stirred at 50° C. for 2 hours.

Then, the liquid phase was decanted and the solid was washed 1 time with 500 ml 1,2-dichloroethane at 50° C., 1 time with 500 ml iso-octane at 50° C. and 4 times with 500 ml iso-octane at 75° C. The resulting solid (cat. component 12) was found to contain 1.1% w Ti.

EXAMPLE XV 10.1 g of solid A, described in Example I, was slurried in 125 ml 1,2-dichloroethane at 50° C. To this slurry was added 42 mg of neat $SbCl_5$ (1% mol. on Ti), and stirring was continued for 2 hours at 50° C.

Then, the liquid phase was decanted and the solid was washed 1 time with 105 ml 1,2-dichloroethane at 50° C., 1 time with 115 ml 1,2-dichloroethane at 75° C. and 4 times with 120 ml iso-octane at 75° C.

3 g of the resulting solid was suspended in 40 ml iso-octane and 34.5 g of $TiCl_4$ (182 mmol.) was added and the resulting slurry was stirred at 80° C. for 2 hours. The liquid phase was decanted and the solid was washed 7 times with 75 ml iso-octane at 80° C. The resulting solid (cat. component 13) was found to contain 1.4% w Ti.

EXAMPLE XVI 3.0 g of catalyst component 11 was suspended in 86 g (455 mmol.) undiluted $TiCl_4$ and stirred at 80° C. for 2 hours. The liquid phase was decanted and the solid was washed 7 times with 100 ml iso-octane at 80° C. The resulting solid (cat. component 14) was found to contain 1.8% w Ti.

The polymerization results of all catalyst components described in Examples I–XVI are included in the Table, from which it can be seen that the catalyst components of the invention have an improved performance as to the combined effect of catalyst activity (polymer yield) and stereospecificity (percentage solubles), when compared with the reference catalyst components A and B. Comparison of runs e and f shows that the catalyst components of this invention are not sensitive to the presence of hydrogen during polymerization.

The polymerization runs for testing the performance of the various catalysts involved the following operations:

Activating organoaluminum compound was mixed with 15 ml iso-octane and introduced into a 5 l autoclave containing 3000 ml and in some runs 4000 ml liquid propylene and in some runs hydrogen (partial hydrogen pressure 98 kPa), as shown in the Table. Immediately thereafter the solid catalyst component was introduced into the reactor in the form of a suspension in 15 ml iso-octane. The amounts of solid catalyst component and organoaluminum compound were such as to produce in the reactor a molar concentration of aluminum compound and an Al:Ti molar ratio as indicated in the Table. The autoclave was then heated to 70° C. in 5 minutes and the polymerization was continued at that temperature and a total pressure of 2900 kPa, while stirring the contents of the reactor. The organoaluminum compound used was triethyl aluminum in all runs except runs g, s, t and u. In run g tri-isobutyl aluminum was employed. In runs s, t and u the aluminum compound was a complex of 1 mmol. triethyl aluminum and 0.29 mmol. p-methoxy ethylbenzoate.

After polymerization, remaining unconverted liquid propylene was removed by depressurizing and the polymer was analyzed to determine the contents of amorphous material (XS-xylene solubles)—i.e., the percentage of material remaining soluble when cooling a solution of polymer in xylene from its boiling point to room temperature—and the contents of Ti, Al and Cl in the polymer. No intermediate treatments to deactivate the catalyst or to purify the polymer by extraction were employed.

TABLE

| Run | Catalyst component | Polymerization Propylene L | [Al] mmol/L | Al:Ti molar ratio | Polymerization period, hrs | H₂ | Results Yield, kg/pol/g Ti | XS, % | Ti | Al ppm | Cl |
|---|---|---|---|---|---|---|---|---|---|---|---|
| a | A | 3 | 0.15 | 15:1 | 2 | — | 120 | 25.7 | 6 | 84 | 55 |
| b | B | 3 | 0.15 | 15:1 | 2 | — | 80 | 2.0 | 14 | 128 | 451 |
| c | 1 | 3 | 0.15 | 15:1 | 2 | — | 510 | 9.9 | 2 | 23 | 33 |
| d | 1 | 3 | 0.15 | 15:1 | 1 | + | 300 | 8.4 | 3 | 16 | 74 |
| e | 2 | 3 | 0.15 | 15:1 | 2 | — | 620 | 9.4 | 1 | 18 | 63 |
| f | 2 | 3 | 0.15 | 15:1 | 2 | + | 618 | 10.2 | 2 | 14 | 50 |
| g | 2 | 3 | 0.075 | 15:1 | 2 | — | 240 | 6.6 | 3 | 85 | 93 |
| h | 3 | 3 | 0.15 | 15:1 | 2 | — | 580 | 6.1 | 2 | 38 | 38 |
| i | 4 | 3 | 0.15 | 15:1 | 2 | — | 343 | 8.1 | 2 | 32 | 52 |
| j | 5 | 3 | 0.15 | 15:1 | 1 | — | 1074 | 20.6 | 1 | 10 | 9 |
| k | 6 | 3 | 0.15 | 15:1 | 2 | — | 457 | 15.1 | 2 | 13 | 26 |
| l | 7 | 3 | 0.15 | 15:1 | 2 | — | 441 | 108 | — | — | — |
| m | 8 | 3 | 0.15 | 15:1 | 2 | — | 418 | 11.9 | — | — | — |
| n | 9 | 3 | 0.15 | 15:1 | 2 | — | 390 | 12.4 | 3 | 8 | 35 |
| o | 10 | 3 | 0.15 | 15:1 | 2 | — | 410 | 14.3 | — | — | — |
| p | 11 | 4 | 0.13 | 10:1 | 1.25 | — | 486 | 3.2 | — | — | — |
| q | 11 | 4 | 0.09 | 10:1 | 2 | — | 482 | 3.9 | — | — | — |
| r | 12 | 4 | 0.123 | 10:1 | 1 | — | 324 | 3.35 | — | — | — |
| s | 13 | 4 | 0.25 | 35:1 | 1 | — | 495 | 2.8 | — | — | — |
| t | 14 | 4 | 0.25 | 35:1 | 0.5 | — | 829 | 4.2 | 1.1 | 25 | 37 |
| u | 14 | 4 | 0.25 | 70:1 | 2 | — | 1381 | 4.8 | 0.7 | 28 | 23 |

What is claimed is:

1. Process for the polymerization of alpha-monoolefins which comprises contacting the monomer or monomers to be polymerized with a catalyst composition comprising (a) an organoaluminum compound, and (b) a titanium-containing catalyst component prepared by contacting a solid composition consisting essentially of magnesium dihalide, an electron donor and a tetravalent titanium halide, this composition being substantially free from aluminum compounds, with a dilute suspension or solution, in a substantially anhydrous liquid medium, of from 1 to 50 mol %, basis titanium, of a halide of B, Al, Ga, In, Tl, Sn or Sb, these elements being present in their highest valency state or a halide of tetravalent Te, and removing from the resulting solid substantially all metal halide originating from the liquid medium; and recovering the resulting olefin polymer.

2. Process for the polymerization of alpha-monoolefins which comprises contacting the monomer or monomers to be polymerized wtih a catalyst composition comprising (a) an organoaluminum compound and (b) a titanium-containing catalyst component prepared by contacting a solid composition obtained by combining a substantially anhydrous solid consisting essentially of magnesium dihalide, an electron donor and titanium tetrahalide, this composition being substantially free from aluminum compounds, with a dilute suspension or solution, in a substantially anhydrous liquid medium, of from 1 to 50 mol percent, basis titanium of a liquid organic compound and a halide selected from the group consisting of $BCl_3$, $BBr_3$, $BI_3$, $AlBr_3$, $AlI_3$, $GaCl_3$, $GaBr_3$, $InCl_3$, $TeCl_4$, $TlCl_3$, $SnCl_4$, $SbCl_5$ and $SbF_5$, and removing from the resulting solid substantially all metal halide originating from the liquid medium by washing it with a substantially anhydrous hydrocarbon or halohydrocarbon liquid; and recovering the resulting olefin polymer.

3. Process for the polymerization of alpha-monoolefins which comprises contacting the monomer or monomers to be polymerized with a catalyst composition comprising (a) an organoaluminum compound and (b) a titanium-containing catalyst component prepared by contacting a solid composition obtained by combining a substantially anhydrous solid consisting essentially of magnesium dichloride, an ester of an aromatic carboxylic acid as electron donor and titanium tetrachloride, this composition being substantially free from aluminum compounds, with a dilute suspension or solution, in a substantially anhydrous liquid hydrocarbon or halohydrocarbon, of from 2 to 10 mol percent, basis titanium, of a halide selected from the group consisting of $SbCl_5$, $SbF_5$ and $SnCl_4$, and removing from the resulting solid substantially all metal halide originating from the liquid medium by washing it with a substantially anhydrous hydrocarbon or halohydrocarbon liquid; and recovering the resulting polymer.

4. Process for the polymerization of alpha-monoolefins which comprises contacting the monomer or monomers to be polymerized with a catalyst composition comprising (a) an organoaluminum compound and (b) a titanium-containing catalyst component prepared by contacting a solid composition obtained by combining a substantially anhydrous solid consisting essentially of magnesium dichloride, an ester of an aromatic carboxylic acid as electron donor and titanium tetrachloride, this composition being substantially free from aluminum compounds, at a temperature in the range from 15° to 80° C. with a dilute suspension or solution, in a substantially anhydrous liquid hydrocarbon or halohydrocarbon, of from 2 to 10 mol percent, basis titanium, of a halide selected from the group consisting of $SbCl_5$, $SbF_5$ and $SnCl_4$ and washing the resulting solid composition with at least two washes of one or more substantially anhydrous liquid hydrocarbons or halohydrocarbons at a temperature between 40° C. and the boiling point of the wash liquid to remove from the resulting solid substantially all metal halide originating from the liquid medium; and recovering the resulting olefin polymer.

5. A process as claimed in any one of claims 2, 3 or 4 in which the solid composition comprises from 0.01 to 5.0 mol of electron donor and from 0.005 to 5 mol of tetravalent titanium halide per mol of magnesium halide, and in which the liquid medium is a halohydrocarbon containing from 2 to 10 mol % of said metal halide per gram-atom of tetravalent titanium contained in the solid composition, at a concentration of less than 0.07 mol of said metal halide per 100 mol of the halohydrocarbon liquid.

6. A process as claimed in any one of claims 1, 2, 3 or 4 in which, after the treatment with liquid medium, a fresh amount of tetravalent titanium halide is incorporated into the catalyst component.

7. A process as claimed in any one of claim, 2, 3 or 4 in which the solid composition comprises from 0.01 to 5.0 mol of electron donor and from 0.005 to 5 mol of tetravalent titanium halide per mol of magnesium halide, and in which the liquid medium is a halohydrocarbon containing from 2 to 10 mol% of said metal halide per gram-atom of tetravalent titanium contained in the solid composition, at a concentration of less than 0.07 mol of said metal halide per 100 mol of the halohydrocarbon liquid, and in which, after the treatment with liquid medium, a fresh amount of tetravalent titanium compound is incorporated into the catalyst component.

8. A process as claimed in claim 2, 3 or 4 in which said metal halide is $SbCl_5$.

9. A process as claimed in claims 2, 3 or 4 in which said metal halide is $SnCl_4$.

10. A process as claimed in claim 7 in which said metal halide is $SbCl_5$.

11. A process as claimed in claim 7 in which said metal halide is $SnCl_4$.

12. A process as claimed in claim 2, 3 or 4 in which component (a) of the catalyst compositin is a trialkyl aluminum in which each alkyl group has 2 to 6 carbon atoms, and in which the molar ratio of aluminum in component (a) to titanium in component (b) is between 1:1 and 20:1.

13. A process as claimed in claim 2, 3 or 4 in which component (a) of the catalyst composition is a complex of a trialkyl aluminum in which each alkyl group has 2 to 6 carbon atoms at least partially complexed with an ester of an aromatic carboxylic acid, and in which the molar ratio of aluminum in component (a) to titanium in component (b) is between 1:1 and 75:1.

14. A process as claimed in claim 12 in which said metal halide is $SbCl_5$.

15. A process as claimed in claim 13 in which said metal halide is $SbCl_5$.

16. A process as claimed in claim 7 in which component (a) of the catalyst composition is a trialkyl aluminum in which each alkyl group has 2 to 6 carbon atoms, and in which the molar ratio of aluminum in component (a) to titanium in component (b) is between 1:1 and 20:1.

17. A process as claimed in claim 7 in which component (a) of the catalyst composition is a complex of a trialkyl aluminum in which each alkyl group has 2 to 6 carbon atoms at least partially complexed with an ester of an aromatic carboxylic acid, and in which the molar ratio of aluminum in component (a) to titanium in component (b) is between 1:1 and 75.1.

18. A process as claimed in claim 16 in which said metal halide is $SbCl_5$.

19. A process as claimed in claim 17 in which said metal halide is $SbCl_5$.

* * * * *